(12) United States Patent
Woo et al.

(10) Patent No.: US 8,467,576 B2
(45) Date of Patent: Jun. 18, 2013

(54) METHOD AND APPARATUS FOR TRACKING MULTIPLE OBJECTS AND STORAGE MEDIUM

(75) Inventors: Woon Tack Woo, Gwangju (KR); Young Min Park, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 229 days.

(21) Appl. No.: 12/953,354

(22) Filed: Nov. 23, 2010

(65) Prior Publication Data

US 2011/0081048 A1 Apr. 7, 2011

Related U.S. Application Data

(63) Continuation of application No. PCT/KR2009/003771, filed on Jul. 9, 2009.

(30) Foreign Application Priority Data

Jul. 9, 2008 (KR) .......................... 10-2008-0066519

(51) Int. Cl.
*G06K 9/00* (2006.01)
(52) U.S. Cl.
USPC ........................................................ 382/103
(58) Field of Classification Search
USPC ........................................................ 382/103
See application file for complete search history.

(56) References Cited

U.S. PATENT DOCUMENTS

| | | | |
|---|---|---|---|
| 6,542,621 B1 * | 4/2003 | Brill et al. ...................... | 382/103 |
| 7,400,745 B2 * | 7/2008 | Crabtree ....................... | 382/103 |
| 8,116,534 B2 * | 2/2012 | Nishiyama et al. ........... | 382/118 |
| 2003/0107649 A1 * | 6/2003 | Flickner et al. ............... | 348/150 |
| 2006/0092280 A1 | 5/2006 | Kamijo et al. | |
| 2006/0195858 A1 | 8/2006 | Takahashi et al. | |
| 2008/0109397 A1 * | 5/2008 | Sharma et al. ................ | 707/1 |
| 2009/0002489 A1 * | 1/2009 | Yang et al. .................... | 348/143 |

FOREIGN PATENT DOCUMENTS

| | | |
|---|---|---|
| KR | 10-2000-0054784 A | 9/2000 |
| KR | 10-2008-0017521 A | 2/2008 |

OTHER PUBLICATIONS

International Search Report for PCT/KR2009/003771 filed Jul. 9, 2009.
Written Opinion of the International Searching Authority for PCT/KR2009/003771 filed Jul. 9, 2009.

* cited by examiner

*Primary Examiner* — Tom Y Lu

(57) ABSTRACT

The present invention relates to a method and an apparatus for tracking multiple objects and a storage medium. More particularly, the present invention relates to a method and an apparatus for tracking multiple objects that performs object detection of one subset per an input image by performing only objection detection of one subset per camera image regardless of the number N of objects to be tracked and tracks all objects among images while the objects are detected to track multiple objects in real time, and a storage medium. The method for tracking multiple objects according to the exemplary embodiment of the present invention includes: (a) performing object detection with respect to only objects of one subset among multiple objects with respect to an input image at a predetermined time; and (b) tracking all objects among images from an image of a time prior to the predetermined time with respect to all objects in the input image while step (a) is performed.

11 Claims, 6 Drawing Sheets

FIG. 4
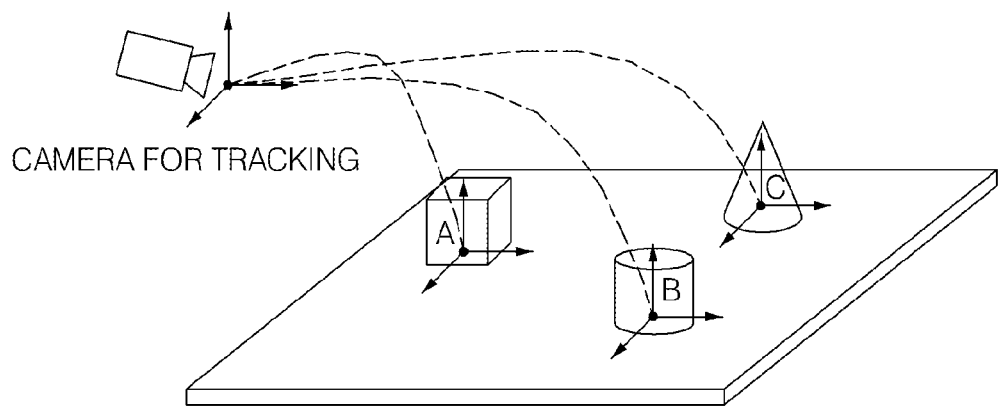
CAMERA FOR TRACKING
[FIG. 5]
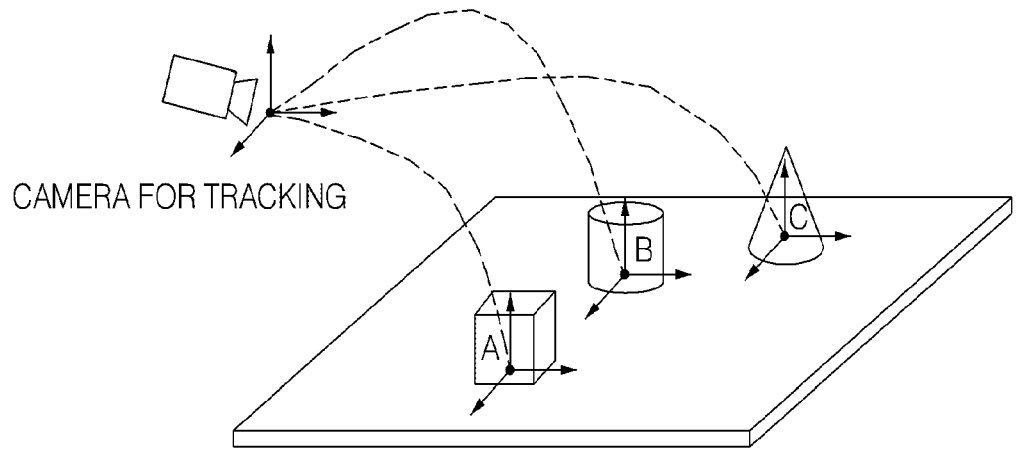
CAMERA FOR TRACKING

METHOD AND APPARATUS FOR TRACKING MULTIPLE OBJECTS AND STORAGE MEDIUM

TECHNICAL FIELD

The present invention relates to a method and an apparatus for tracking multiple objects and a storage medium. More particularly, the present invention relates to a method and an apparatus for tracking multiple objects that perform object detection of one subset per input image by performing only objection detection of one subset per camera image regardless of the number N of objects to be tracked and track all objects among images while the objects are detected to track multiple objects in real time, and a storage medium.

BACKGROUND ART

Augmented reality as one of the fields of virtual reality is a technique that combines a virtual object with a real environment to allow a user to look like an object that exists in an original environment.

Unlike the existing virtual reality targeting only virtual space and objects, the augmented reality can add and provide additional information which is difficult to acquire through only the real world by combining virtual objects with the real world. That is, since the virtual reality technique generally allows the user to be immersed in a virtual environment, the user cannot view the real environment, while the user can view the real environment and the real environment and the virtual objects are mixed in the augmented reality technique. In other words, the virtual reality replaces the real world to be viewed to the user, but the augmented reality has a distinction in that the real world is supplemented by overlapping the virtual objects with the real world to allow the user to the supplemented real world and provides better reality to the user than the virtual reality. Due to these characteristics, unlike the existing virtual reality which can be limitatively applied to only a field such as a game, the augmented reality can be applied to various real environments, particularly, the augmented reality is widely used as a next-generation display technology suitable for a ubiquitous environment.

A quadrangular marker is generally used in the related art as the real environment for augmenting the virtual objects. This allows markers of a predetermined pattern to be detected and tracked in a black frame and can detect a plurality of markers. However, when a part of the marker is occluded, it is difficult to track the marker and the marker attracts the user's eyes by high contrast of white and black to inhibit the user's view and deteriorate user's immersion.

A method of using a real object appears in order to solve the disadvantages of the quadrangular marker. Since the method, which uses a picture or a pattern of the real object, that is, its own texture for detection and tracking instead of the quadrangular marker, uses natural features of the real object, it is excellent in tracking the object even though the object is partially occluded and provides the immersion to the user.

FIG. 1 is a flowchart of a method for tracking multiple objects using the detection of a single object in the related art.

Referring to FIG. 1, a camera image is subjected to the detection of N objects in order to detect and track N objects. That is, when object N is detected by repetitively performing a process in which object 1 is detected and thereafter, object 2 is detected with respect to an input image at time t, a list (objects 1 to N) and poses of objects detected at time t are derived. Next, a list (object 1 to N) and poses of objects detected at time t+1 are derived by repetitively performing the process of detecting objects 1 to N with respect to an input image at time t+1. Such a process is repetitively performed up to a desired time. Therefore, by such a method, the overall performance is deteriorated to 1/N as compared with the case of detecting one object per input image.

The real object tracking algorithm is optimized to a case in which only a single object exists in the camera image. According to the algorithm, whether or not the single object to be detected exists from the input image is determined and when the single object exists in the input image, a 3D pose including a 3-axis position and a 3-axis orientation of the corresponding object is estimated. Since the algorithm goes through the process, it is suitable to apply to the single object. When the algorithm is used to track multiple objects, whether or not all objects to be tracked exist for each input image should be determined. Therefore, since the processing speed is decreased in proportion to the number of objects, it is difficult to operate the algorithm in real time.

DISCLOSURE

Technical Problem

The present invention has been made in an effort to provide a method and an apparatus for tracking multiple objects that can prevent overall tracking performance from being deteriorated in spite of concurrently tracking multiple objects as well as a single object and adopt augmented reality capable of providing dynamic variety while moving each object using the multiple objects, and a storage medium.

Technical Solution

In a method for tracking multiple objects according to an exemplary embodiment of the present invention, object detection is performed with respect to only objects of one subset per input image.

Advantageous Effects

According to exemplary embodiments of the present invention, it is possible to prevent overall tracking performance from being deteriorated in spite of concurrently tracking multiple objects as well as a single object and adopt augmented reality capable of giving dynamic variety while moving each object using the multiple objects, and provide more improved stability than a pose of an object estimated by only a current camera image by applying object tracking among images.

DESCRIPTION OF DRAWINGS

FIGS. 4 and 5 are conceptual diagrams illustrating an example in which objects A, B, and C are independent objects and movements of the objects are concurrently tracked;

BEST MODE

Figure 1:
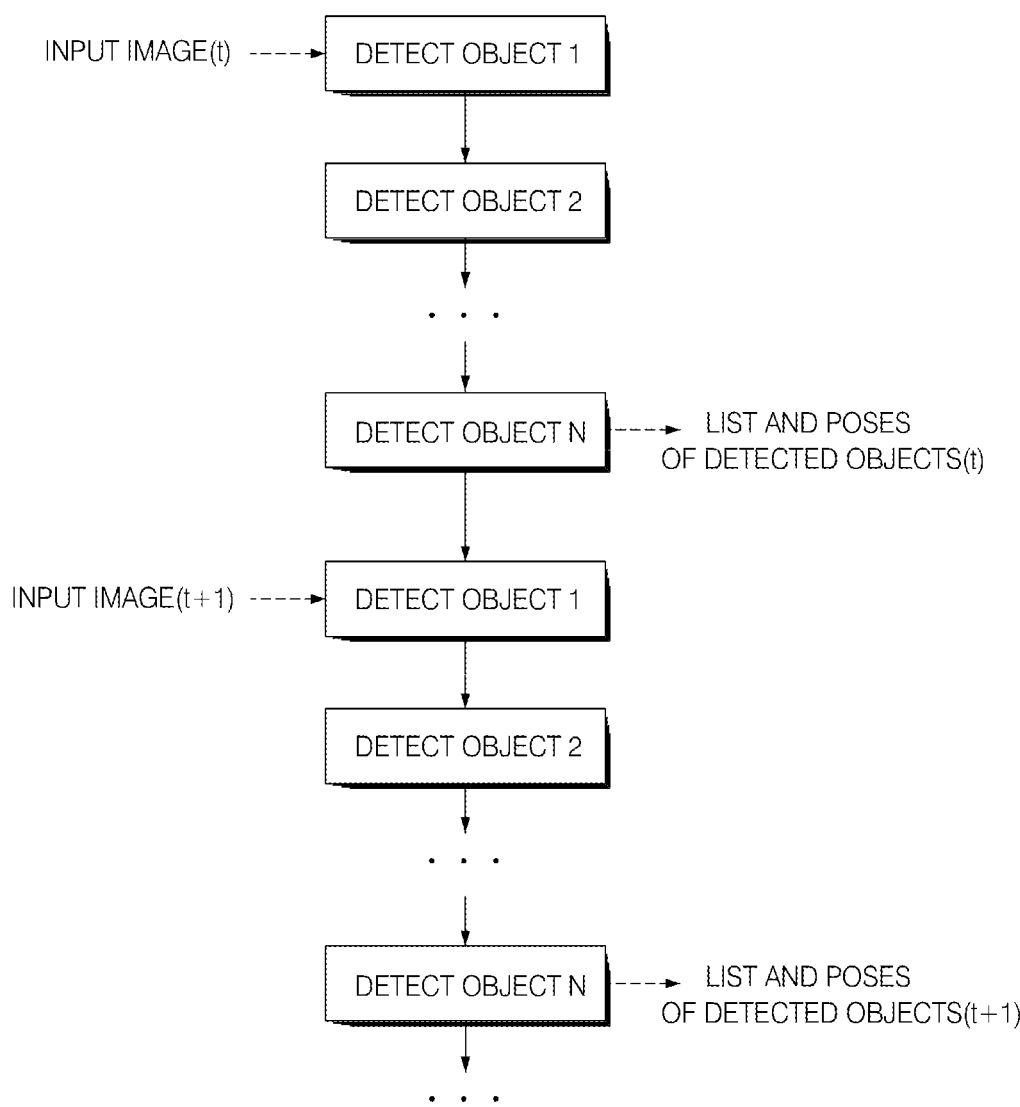
FIG. 1 is a flowchart of a method for tracking multiple objects using the detection of a single object in the related art.

An exemplary embodiment of the present invention provides a method for tracking multiple objects that includes: (a) performing object detection with respect to only objects of one subset among multiple objects with respect to an input image at a predetermined time; and (b) tracking all objects among images from an image of a time prior to the predetermined time with respect to all objects in the input image while step (a) is performed.

Herein, step (a) may include: forming a key frame configuring a key frame set for storing an appearance of the object with respect to only an object of one subset among multiple objects with respect to the input image; extracting a keypoint from the key frame and measuring a 3 dimensional position of the extracted keypoint; and measuring a pose of the object of one subset by matching the extracted keypoint with the feature point extracted with respect to the input image.

Further, at step (b), all the objects among the images may be tracked by extracting a feature point of the object of the input image and matching the feature point with a feature point extracted from the image at the previous time.

Another exemplary embodiment of the present invention provides an apparatus for tracking multiple objects that includes: a detector performing object detection with respect to only an object of one subset among multiple objects with respect to an input image at a predetermined time; and a tracker tracking all objects among images from an image at a time prior to the predetermined time with respect to all objects in the input image while the detector performs the object detection.

Further, the detector and the tracker may be operated in independent threads, respectively to perform detection and tracking on a multi-core CPU in parallel.

Further, the tracker may track all the objects among the images by extracting a feature point in the object of the input image and matching the extracted feature point with a feature point extracted from the image at the previous time.

Further, the detector may include: a key frame forming unit configuring a key frame set for storing an appearance of the object with respect to only an object of one subset among multiple objects with respect to the input image; a keypoint extracting unit extracting a keypoint from the key frame and measuring a 3 dimensional (D) position of the extracted keypoint; and a pose measuring unit measuring a pose of the object of one subset by matching the extracted keypoint with the feature point extracted with respect to the input image.

Mode for Invention

Hereinafter, exemplary embodiments of the present invention will be described in detail with reference to the accompanying drawings. First, it is to be noted that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention. Hereinafter, the preferred embodiment of the present invention will be described, but it will be understood to those skilled in the art that the spirit and scope of the present invention are not limited thereto and various modifications and changes can be made.

In object detection, processing speed is decreased in proportion to the number of objects, but tracking 3D movement of multiple objects among images is comparatively low in deterioration of performance. The object detection technique makes a tracking application more robust, but is limited to process the tracking application in real time. According to the exemplary embodiment of the present invention, a time to detect multiple objects is divided in successive frames to perform the object detection in real time. Undetected objects among objects that exist in the current frame are detected in any one of the subsequent frames. During this process, a slight delay may occur, but it is practically almost difficult for a user to detect the slight delay. Therefore, the user determines that the object detection is made in real time.

When a new object appears, the object is immediately detected by a system that initializes frame-by-frame object tracking. After the new object is detected, the frame-by-frame object tracking is initialized (started). For this, "temporal keypoints" are used. The temporal keypoints are feature points detected on the surface of the object. The temporal keypoints match the successive frames. By this method, in the case of the object of which tracking is initialized (started), a pose of the object may be accurately calculated even when the object is not detected and less time is consumed than object detection.

As such, object detection is performed while the frame-by-frame object tracking is performed and even when the frame-by-frame object tracking has already been performed, the object detection may be performed. According to such a method, it is possible to prevent a track from being lost by fast movement or occlusion. The detection and the tracking are separated from each other and may be performed at different cores of a parallel processor.

Figure 2:
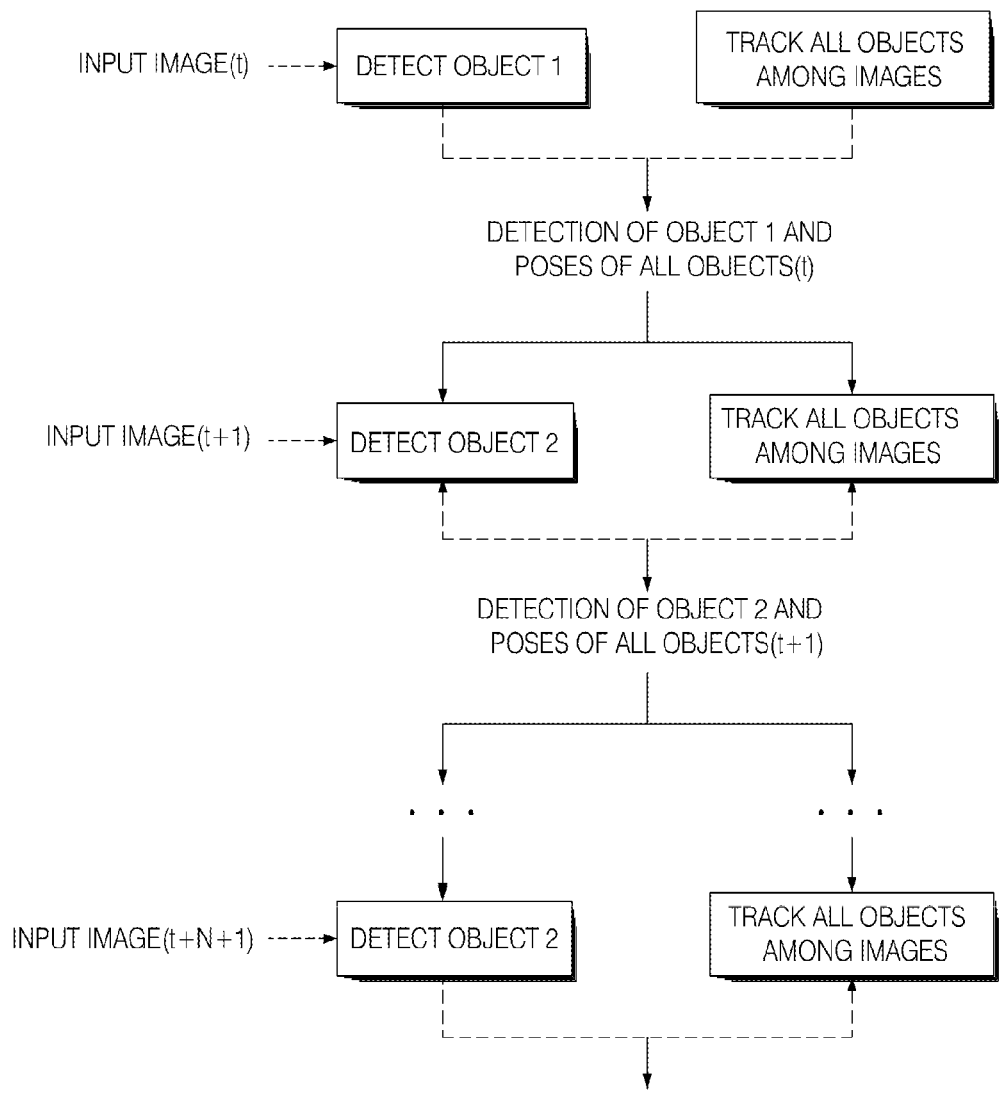
FIG. 2 is a flowchart of a method for tracking objects according to an exemplary embodiment of the present invention.

FIG. 2 is a flowchart of a method for tracking objects according to an exemplary embodiment of the present invention.

In the object tracking method according to the exemplary embodiment of the present invention, referring to FIG. 2, the object of one subnet per camera image is detected regardless of the number N of objects to be tracked to thereby detect the object of one subset per input image. That is, the object of one subset is detected for each of the total N image inputs, such that temporal-division object detection is made at the time of tracking N objects. All objects are tracked among the images for a time interval when each object is detected. In other words, the movement of the detected object is tracked.

More specifically, object detection is performed with respect to only objects that belong to set 1 among the multiple objects in the case of an input image at time t and all objects including the objects that belongs to set 1 are tracked among the images with respect to images of previous times t−1, t−2, . . . to calculate the poses of all objects at time t while detecting the objects that belong to set 1.

Moreover, object detection is performed with respect to only objects that belong to set 2 among the multiple objects in the case of an input image at time t+1 and all objects including the objects that belongs to set 2 are tracked among the images with respect to images of previous times t, t−1, . . . to calculate poses of all objects at time t+1 while detecting the objects that belong to set 2.

Such a process is repetitively performed up to an input image of a time t+N+1, objects that belong to set N are detected, and all objects among images are tracked.

That is, in a first image, objects that belong to set 1 are detected and in an N-th image, objects that belong to set N are detected. In an N+1-th image, a method of detecting the objects that belong to set 1 is repetitively performed again. Consequently, since each object is detected only once per 1/N frame, the pose is consistently tracked by the frame-by-frame object tracking while no object is detected.

Figure 3:
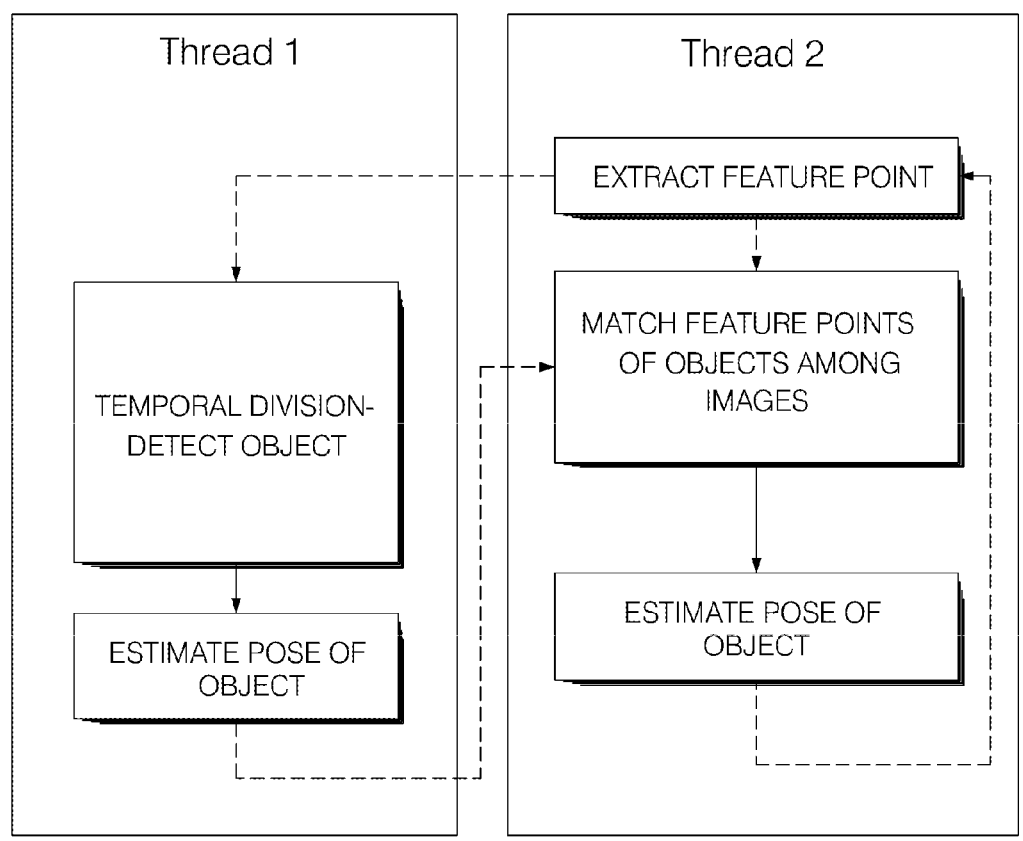
FIG. 3 is a detailed flowchart of each process according to an exemplary embodiment of the present invention.

FIG. 3 is a detailed flowchart of each process according to an exemplary embodiment of the present invention.

Object detection and frame-by-frame object tracking are operated in independent threads to be performed on a multi-core CPU in parallel. That is, in FIG. 3, the objection detection is performed in Thread 1 and the frame-by-frame object tracking is performed in Thread 2.

In Thread 1, keypoints extracted from an input image in Thread 2 match a subset of a key frame to perform temporal-division object detection and perform object pose estimation by using the same.

In Thread 2, the keypoints are extracted from the input image and match feature points of the objects among the images by performing matching with the previous frame to perform the object pose estimation.

Although not shown, when Thread 1 is implemented by the apparatus for tracking multiple objects that performs the method for tracking multiple objects according to the exemplary embodiment of the present invention, Thread 1 includes a detector that performs object detection of only objects of one subset among multiple objects with respect to an input image at a predetermined time. Herein, the detector includes a key frame forming unit configuring a key frame set for storing an exterior of only an object of one subset among the multiple objects with respect to the input image, a keypoint extracting unit extracting the keypoint from the key frame and measuring a 3D position of the extracted keypoint, and a pose measuring unit matching the keypoint of the key frame with the feature point extracted from the input image and measuring a pose of the object.

Further, Thread 2 includes a tracker that tracks all objects among the images from an image prior to a predetermined time with respect to all the objects in the input image while object detection is performed by the detector and extracts feature points from the object of the input image and matches the feature point extracted from the image of the previous time to track all the objects among the images.

More specifically, the tracker generates temporal keypoints by using additional feature points that belong to a region of the object detected in the image among feature points that are not used for object detection with respect to the objects detected by the object detector at a predetermined time. Further, in the case of an object that is not detected but tracked, a pose of an object in the input image is estimated by using a temporal keypoint of the corresponding object, which is generated at the previous time and thereafter, the temporal keypoint is generated.

When the temporal keypoints are extracted from the image of the previous time, pose estimation is performed through the mergence with the feature points extracted from the input image and when the temporal keypoints are not extracted, the pose estimation is performed independently without the mergence with the feature points of the input image to track all the objects among the images.

In addition, the tracker determines whether or not the tracking of the object detected by the detector has already been initialized and when the tracking is not initialized, track initialization is performed and when the tracking has already been initialized, the pose estimation is performed by the mergence with the temporal keypoints generated from the image of the previous time. Further, the tracker estimates a pose of an object which is not detected in the detector but has already been subjected to the track initialization at the previous time in the input image by using only the temporal keypoint generated in the image previous time. The tracker tracks multiple objects that exist in the image while the detector included in Thread 1 detects the object of one subset with respect to the input image.

As such, in the method for tracking the multiple objects according to the exemplary embodiment of the present invention, detection for tracking a target object is performed whenever an object to be tracked exists in a current frame and a jittering effect which may occur at the time of estimating the pose by performing only the detection is removed.

An object model includes geometrical information and an appearance of the target object. The geometrical information is a 3D model stored in the form of a list of triangles and multiple software which may acquire the 3D model from an image exists.

The appearance is constituted by key frame sets. The key frame sets may store object shapes from various viewpoints to occlude most of the object. In general, three to four key frames are enough to occlude the object in all directions. A feature point called a keypoint is extracted for each key frame and the extracted keypoint is back-projected onto the 3D model to easily measure the 3D position of the keypoint. The keypoint and the 3D position are stored to be used during the detection process. Hereinafter, the object detection and the frame-by-frame object tracking will be described in more detail.

All key frames are divided into subsets and the subsets match the camera images. For example, each subset is shown in Equation 1 below.

$$S_1 = \{k_1, k_2, \ldots, k_f\}$$
$$S_2 = \{k_{f+1}, k_{f+2}, \ldots, k_{2f}\}$$
$$\vdots$$
$$S_{N/f} = \{k_{f \cdot floor(\frac{N}{f})+1}, \ldots, k_N\}$$

[Equation 1]

$K_j$ represents a key frame, f represents the number of key frames which may be handled per frame rate, and N represents the total number of key frames.

Each input frame matches any one key frame among subsets $S_i$. The subsets are repetitively considered one by one and when an N/f frame ends, the subset starts from $S_1$ again.

FIGS. 4 and 5 are conceptual diagrams showing an example in which objects A, B, and C are independent objects and movements (6 DOF; Degrees of Freedom) of the objects are concurrently tracked.

Figure 6:
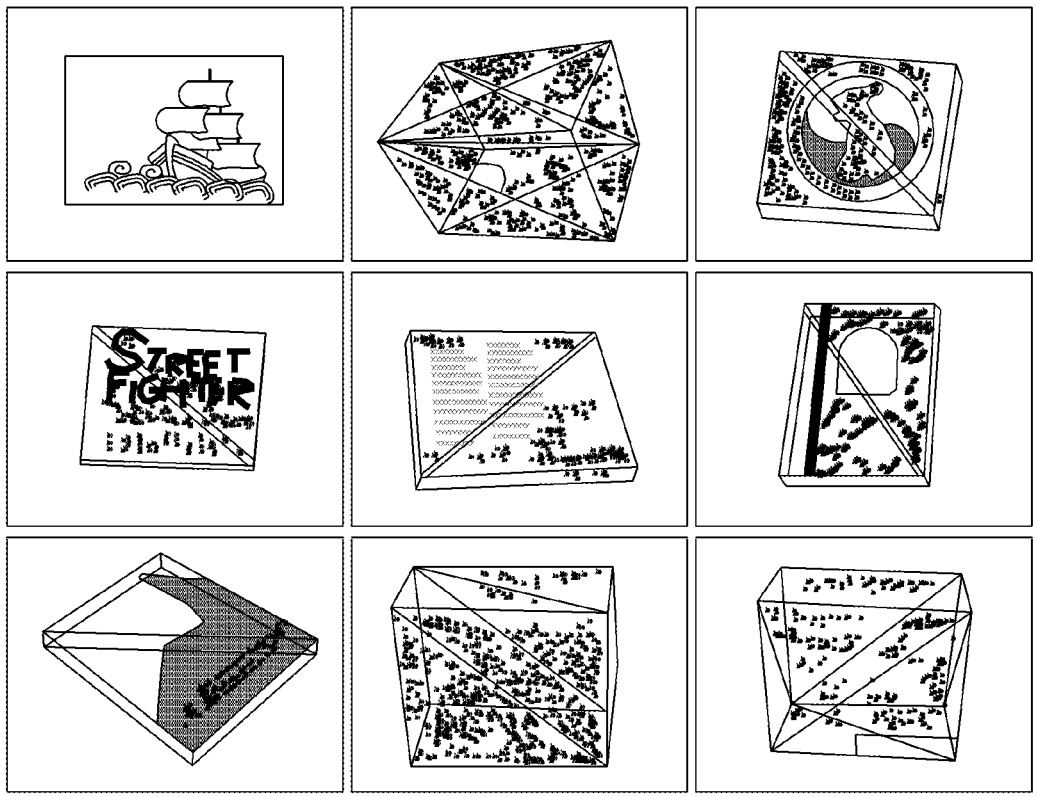
FIG. 6 is a diagram illustrating examples of key frames used to track multiple 3D objects.

FIG. 6 is a diagram showing an example of a key frame used to track multiple 3D objects.

In the exemplary embodiment, a total key frame set includes nine key frames. One subset includes one of the key frames and nine subsets are configured. One subset matches a camera frame. One subset may include a plurality of key frames depending on detection performance.

Figure 7:
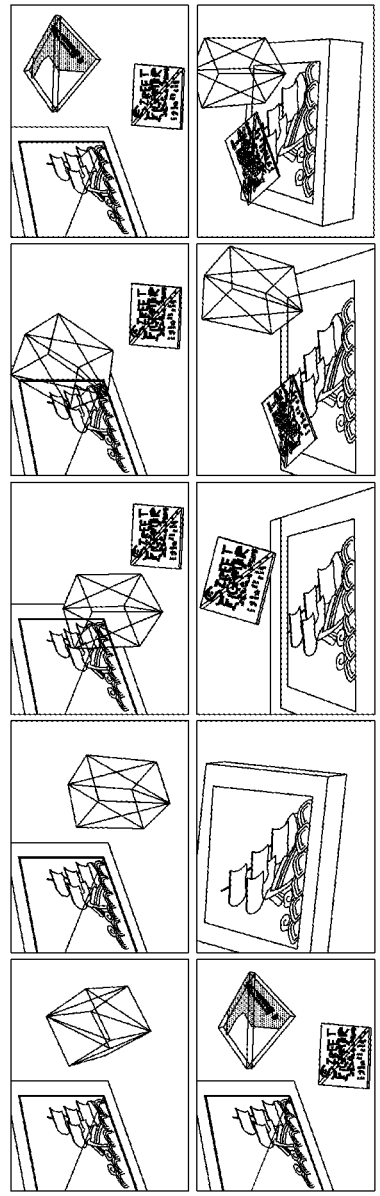
FIG. 7 is a photograph illustrating the tracking of multiple 3D objects.

FIG. 7 is a photograph showing the tracking of multiple 3D objects.

In FIG. 7, all three objects exist in the image and are concurrently tracked. The pose of the object is accurately calculated even when the object is moved by a hand or partial occlusion occurs among the objects. The objects are consistently detected while being tracked. A calculated 3D pose is projected to a 3D model with respect to all frames and display as a line.

Meanwhile, the present invention can be implemented as a computer-readable code in a computer-readable recording medium. The computer-readable recording media includes all types of recording apparatuses in which data that can be read by a computer system is stored.

Examples of the computer-readable recording media include a ROM, a RAM, a CD-ROM, a magnetic tape, a floppy disk, an optical data storage, etc., and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme. In addition, a functional program, a code, and code segments for implementing the present invention will be easily interred by programmers skilled in the art.

The spirit of the present invention has just been exemplified. It will be appreciated by those skilled in the art that various modifications, changes, and substitutions can be made without departing from the essential characteristics of the present invention. Accordingly, the embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

INDUSTRIAL APPLICABILITY

The present invention can be widely applied to an information device supporting augmented reality including a mobile, multimedia signal processing, and signal and image processing fields.

The invention claimed is:

1. A method for tracking multiple objects, comprising:
    (a) obtaining video data including a first image frame and a second image frame, wherein the first image frame is a next image frame of the second image frame;
    (b) detecting at least one object included in a first subset of the multiple objects from the first image frame; and
    (b) tracking the multiple objects between the first image frame and the second image frame while step (b) is performed,
    wherein step (b) includes:
    selecting at least one key frame corresponding to the at least one object of the first subset from a key frame set for storing an appearance of the multiple objects,
    extracting a keypoint from the selected at least one key frame, and
    measuring a pose of the at least one object of the first subset by matching the extracted keypoint with a feature point extracted from the first image frame.

2. The method of claim 1, wherein step (b) includes:
    extracting the feature point of the multiple objects from the first image frame; and
    matching the extracted feature point with a feature point extracted from the second image frame.

3. The method of claim 1, wherein step (b) further includes:
    measuring a 3 dimensional position of the extracted keypoint, and
    wherein the pose of the at least one object of the first subset is measured based on the 3 dimensional position of the extracted keypoint.

4. The method of claim 1, further comprising:
    (d) detecting at least one object included in a second subset of the multiple objects from a third image frame; and
    (e) tracking the multiple objects between the first image frame and the third image frame, wherein the third image frame is included in the video data and a next frame of the first image frame while step (d) is performed.

5. The method of claim 4, wherein the at least one object of the second subset is a different object from the at least one object included in the first subset.

6. An apparatus for tracking multiple objects, comprising:
    a memory storing a key frame set, wherein the key frame set includes key frames for storing an appearance of the multiple objects;
    a video input unit obtaining video data including a first image frame and a second image frame, wherein the first image frame is a next image frame of the second image frame;
    a detector detecting at least one object included in a first subset of the multiple objects from the first image frame; and
    a tracker tracking the multiple objects between the second image frame and the first image frame while the detector detects the at least one object of the first subset,
    wherein the detector detects the at least one object of the first subset by:
    selecting at least one key frame corresponding to the at least one object of the first subset from a key frame set for storing an appearance of the multiple objects,
    extracting a keypoint from the selected at least one key frame, and
    measuring a pose of the at least one object of the first subset by matching the extracted keypoint with a feature point extracted from the first image frame.

7. The apparatus of claim 6, wherein the detector and the tracker are operated in independent threads, respectively to perform detection and tracking on a multi-core CPU in parallel.

8. The apparatus of claim 6, wherein the tracker tracks the multiple objects by extracting the feature point of the multiple objects from the first image frame and matching the extracted feature point with a feature point extracted from the second image frame.

9. The apparatus of claim 6, wherein the detector measures a 3 dimensional position of the extracted keypoint and measures the pose of the at least one object of the first subset based on the 3 dimensional position of the extracted keypoint.

10. The apparatus of claim 6, wherein the video data includes the third image frame which is a next image frame of the first image frame, and wherein a detector detects at least one object included in a second subset of the multiple objects from the third image frame, and a tracker tracks the multiple objects between the first image frame and the third image frame while the detector detects the at least one object of the second subset.

11. The apparatus of claim 10, wherein the at least one object of the second subset is a different object from the at least one object included in the first subset.

* * * * *